(12) United States Patent
Zhou et al.

(10) Patent No.: US 10,665,013 B2
(45) Date of Patent: May 26, 2020

(54) METHOD FOR SINGLE-IMAGE-BASED FULLY AUTOMATIC THREE-DIMENSIONAL HAIR MODELING

(71) Applicant: ZHEJIANG UNIVERSITY, Hangzhou (CN)

(72) Inventors: Kun Zhou, Hangzhou (CN); Menglei Chai, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 24 days.

(21) Appl. No.: 16/163,556

(22) Filed: Oct. 17, 2018

(65) Prior Publication Data

US 2019/0051048 A1 Feb. 14, 2019

Related U.S. Application Data

(63) Continuation of application No. PCT/CN2016/079613, filed on Apr. 19, 2016.

(51) Int. Cl.
*G06T 17/00* (2006.01)
*G06T 17/20* (2006.01)
(Continued)

(52) U.S. Cl.
CPC .......... *G06T 17/20* (2013.01); *G06K 9/00268* (2013.01); *G06K 9/00503* (2013.01);
(Continued)

(58) Field of Classification Search
CPC ....... G06T 17/00; G06T 2200/04; G06T 7/11; G06T 15/205; G06T 2207/20081; G06T 2207/20112
See application file for complete search history.

(56) References Cited

U.S. PATENT DOCUMENTS

| 5,404,426 A | 4/1995 | Usami et al. ................. 395/120 |
| 2014/0233849 A1* | 8/2014 | Weng ................. G06K 9/00281 382/154 |
| 2016/0314619 A1* | 10/2016 | Luo ..................... G06K 9/00221 |

FOREIGN PATENT DOCUMENTS

| CN | 102103690 A | 6/2011 |
| CN | 102419868 A | 4/2012 |

(Continued)

OTHER PUBLICATIONS

Balan, Alexandru O. et al., "Detailed Human Shape and Pose from Images" Published in 2007 IEEE Conference on Computer Vision and Pattern Recognition; (Jun. 2007); DOI: 10.1109/CVPR.2007.383340.

(Continued)

*Primary Examiner* — Weiming He
(74) *Attorney, Agent, or Firm* — J.C. Patents (57) ABSTRACT

Provided is a single-image-based fully automatic three-dimensional (3D) hair modeling method. The method mainly includes four steps: generation of hair image training data, hair segmentation and growth direction estimation based on a hierarchical depth neural network, generation and organization of 3D hair exemplars, and data-driven 3D hair modeling. The method can automatically and robustly generate a complete high quality 3D model of which the quality reaches the level of the currently most advanced user interaction-based technology. The method can be used in a series of applications, such as hair style editing in portrait images, browsing of hair style spaces, and searching for Internet images of similar hair styles.

5 Claims, 4 Drawing Sheets (51) Int. Cl.
*G06T 7/11* (2017.01)
*G06K 9/00* (2006.01)
*G06N 3/08* (2006.01)
*G06T 7/187* (2017.01)
*G06N 3/04* (2006.01)
*G06K 9/46* (2006.01)
*G06K 9/62* (2006.01)

(52) U.S. Cl.
CPC ....... *G06K 9/00536* (2013.01); *G06K 9/4628* (2013.01); *G06K 9/6274* (2013.01); *G06N 3/0454* (2013.01); *G06N 3/08* (2013.01); *G06N 3/088* (2013.01); *G06T 7/11* (2017.01); *G06T 7/187* (2017.01); *G06T 17/00* (2013.01)

(56) References Cited

FOREIGN PATENT DOCUMENTS

| CN | 102800129 A | 11/2012 | |
|---|---|---|---|
| CN | 104463172 A | 3/2015 | |
| CN | 105844706 A | 8/2016 | |
| JP | 2001-307135 A | 11/2001 | |
| KR | 10-2011-0131947 | * 12/2011 | ............. G06T 17/10 |

OTHER PUBLICATIONS

Forney Jr., G. David, "The Viterbi Algorithm" Proceedings of the IEEE; vol. 61, Issue 3; (Mar. 1973); DOI: 10.1109/PROC.1973.9030.

Ling, Haibin et al., "An Efficient Earth Mover's Distance Algorithm for Robust Histogram Comparison" IEEE Transactions on Pattern Analysis and Machine Intelligence; vol. 29, Issue 5; (May 2007); DOI: 10.1109/TPAMI.2007.1058.

Liu, Jiangyu et al., "Paint Selection" ACM Transactions on Graphics (TOG); vol. 28, Issue 3; (Aug. 2009); Article No. 69; DOI:10.1145/1531326.1531375.

Huang, Jin et al., "Subspace Gradient Domain Mesh Deformation" ACM Transactions on Graphics (TOG); vol. 25, Issue 3; (Jul. 2006); pp. 1126-1134; DOI: 10.1145/1141911.1142003.

Echevarria, Jose I. et al., "Capturing and Stylizing Hair for 3D Fabrication" ACM Transactions on Graphics (TOG); vol. 33, Issue 4; (Jul. 2014); Article No. 125; DOI: 10.1145/2601097.2601133.

Simonyan, Karen et al., "Very Deep Convolutional Networks for Large-Scale Image Recognition" arXiv preprint arXiv:1409.1556; (2014).

Luo, Linjie et al., "Structure-Aware Hair Capture" ACM Transactions on Graphics (TOG); vol. 32, Issue 4; (Jul. 2013); Article No. 76; DOI: 10.1145/2461912.2462026.

Hu, Liwen et al., "Robust Hair Capture Using Simulated Examples" ACM Transactions on Graphics (TOG); vol. 33, Issue 4; (Jul. 2014); Article No. 126; DOI: 10.1145/2601097.2601194.

Hu, Liwen et al., "Capturing Braided Hairstyles" ACM Transactions on Graphics (TOG); vol. 33, Issue 6; (Nov. 2014); Article No. 225; DOI: 10.1145/2661229.2661254.

Hu, Liwen et al., "Single-View Hair Modeling Using a Hairstyle Database" ACM Transactions on Graphics (TOG); vol. 34, Issue 4; (Aug. 2015); Article No. 125; DOI: 10.1145/2766931.

Desbrun, Mathieu et al., "Implicit Fairing of Irregular Meshes using Diffusion and Curvature Flow" SIGGRAPH '99 Proceedings of the 26th annual conference on Computer graphics and interactive techniques; pp. 317-324.

Chai, Menglei et al., "Dynamic Hair Manipulation in Images and Videos" ACM Transactions on Graphics (TOG); vol. 32, Issue 4; (Jul. 2013); Article No. 75; DOI: 10.1145/2461912.2461990.

Chai, Menglei et al., "High-Quality Hair Modeling from a Single Portrait Photo" ACM Transactions on Graphics (TOG); vol. 34, Issue 6; (Nov. 2015); Article No. 204; DOI: 10.1145/2816795.2818112.

Chai, Menglei et al., "Single-View Hair Modeling for Portrait Manipulation" ACM Transactions on Graphics (TOG); vol. 31, Issue 4; (Jul. 2012); Article No. 116; DOI: 10.1145/2185520.2185612.

Girshick, Ross et al., "Rich feature hierarchies for accurate object detection and semantic segmentation" 2014 IEEE Conference on Computer Vision and Pattern Recognition; (Jun. 2014); pp. 580-587; DOI:10.1109/CVPR.2014.81.

Cao, Xudong et al., "Face Alignment by Explicit Shape Regression" 2012 IEEE Conference on Computer Vision and Pattern Recognition (CVPR); (Jun. 2012); pp. 2887-2894.

Jin, Biao et al., "Personalized 3D Face Reconstruction Based on a Single Frontal Human Face Image" Journal of Fujian normal University (Natural Science Edition); vol. 29, No. 1; (Jan. 2013); pp. 36-41.

Liu, Du-Jin et al., "Three-dimensional Facial Reconstruction Method Based on Improved BPNN for Single Photo" Computer Simulation; vol. 28, No. 9; (Sep. 2011); pp. 275-278.

The Chinese First Examination Report of corresponding Chinese application No. 201610244614.3, dated Feb. 23, 2018.

* cited by examiner

A METHOD FOR SINGLE-IMAGE-BASED FULLY AUTOMATIC THREE-DIMENSIONAL HAIR MODELING

CROSS-REFERENCE TO RELATED APPLICATIONS

This application is a continuation of International Application No. PCT/CN2016/079613, filed on Apr. 19, 2016, which is hereby incorporated by reference in its entirety.

TECHNICAL FIELD

The present disclosure relates to the field of single-image-based three-dimensional (3D) modeling, and more particularly, to a method for automatic 3D modeling of hair of a portrait image.

BACKGROUND

Image-based hair modeling is an effective way to create high quality hair geometry. Hair acquisition techniques based on multi-view images often require complex equipment setups and long processing cycles (LUO, L., LI. H., AND RUSINKIEWICZ, S, 2013. Structure-aware hair capture. ACM Transactions on Graphics (TOG) 32, 4, 76.) (ECHEVARRIA, JI. BRADLEY, D., GUTIERREZ. D., AND BEELER, T. 2014. Capturing and stylizing hair for three-dimensional fabrication. ACM Transactions on Graphics (TOG) 33, 4, 125.) (HU, L., MA, C., LUO. L., AND LI, H. 2014. Robust hair capture using simulated examples. ACM Transactions on Graphics (TOG) 33, 4, 126.) (HU. L., MA. C., LUO, L., WEI. L.-Y. AND LI. H. 2014.Capturing braided hair styles. ACM Transactions on Graphics (TOG) 33, 6, 225.), thus, they are not suitable for average users, and are too costly for generating a large number of 3D hair models.

Recently. single-image based hair modeling techniques have yielded impressive results. The prior art achieves modeling by using different kinds of prior knowledge, such as layer boundary and occlusion (CHAI, M., WANG, L., WENG. Y., YU. Y., GUO. B., AND ZHOU, K. 2012. Single-view hair modeling for portrait manipulation. CM Transactions on Graphics (TOG) 31, 4, 116) (CHAI. M., WANG. L., WENG, Y., JIN. X., AND ZHOU, K. 2013. Dynamic hair manipulation in images and videos. ACM Transactions on Graphics (TOG) 32, 4, 75.), a 3D hair model database (HU, L., MA. C., LUO, L., AND LI, H. 2015. Single-view hair modeling using a hair style database. ACM Transactions on Graphics (TOG) 34, 4, 125.), and shadow cues (CHAI, M., LUO. L., SUNKAVALLI, K., CARR. N., HADAP. S., 747 AND ZHOU, K. 2015. High-quality hair modeling from a single portrait photo. ACM Transactions on Graphics (TOG) 34, 6, 204.). But these techniques all require different kinds of user interactions, for example, it is required to manually segment the hair from the image, or to provide strokes by a user to provide hair direction information, or to draw two-dimensional (2D) strands by a user to achieve retrieval. These user interactions typically take 5 minutes, and it takes about 20 minutes to generate a final result, which limits the generation of a large scale of hair models. Unlike the above methods, the present disclosure is fully automatic with high efficiency, and can handle a large number of images at the Internet level.

SUMMARY

The object of the present disclosure is to provide a new fully automatic single-image-based 3D hair modeling method in view of the shortcomings of the prior art, where a hair segmentation result and a direction estimation of high-precision and robustness are obtained through a hierarchical deep convolutional neural network, and then a data-driven method is utilized to match a 3D hair exemplar model to the segmented hair and direction map so as to obtain a final hair model illustrated as strands. The result of this method is comparable to the results of current methods by means of user interactions, and has a high practical value.

The disclosure is realized by following technical solution, which is a fully automatic single-image-based 3D hair modeling method, comprising following steps:

(1) preprocessing of hair training data: labeling hair mask images and hair growth direction maps, and obtaining a classification of different hair styles by an unsupervised clustering method;

(2) fully automatic high-precision hair segmentation and direction estimation: training a deep neural network based on labeled data of step (1), utilizing a hierarchical deep convolutional neural network obtained by the training to achieve hair distribution class identification, hair segmentation and hair growth direction estimation:

(3) generation and organization of 3D hair exemplars: generating a large number of new hair style exemplars by decomposing and recombining hair of original hair models, and generating hair mask images and hair growth direction maps by projection to facilitate subsequent matching;

(4) data-driven hair modeling: matching the 3D hair exemplars in step (3) with a hair mask image and a hair growth direction map segmented in step (2), performing deformation, and generating a final model.

The disclosure has beneficial effects that, a fully automatic single-image-based 3D hair modeling method has been proposed by the disclosure for the first time, where a hair segmentation and a growth direction estimation of high-precision and robustness are achieved by means of a deep neural network, and efficient hair matching and modeling are achieved by a data-driven method. The effect achieved through the present disclosure is comparable to that achieved through the current methods by means of user interactions, and is automatic and efficient, which can be used for modeling a wide range of Internet portrait images.

DESCRIPTION OF EMBODIMENTS

The core technology of the disclosure utilizes a deep neural network to achieve fully automatic high-precision hair segmentation and direction estimation, and utilizes a data-driven hair matching method to achieve high-quality 3D hair modeling. The method mainly includes the following four main steps: preprocessing of hair training data, hair segmentation and direction estimation based on a deep neural network, generation and organization of 3D hair exemplars, and data-driven 3D hair modeling.

Figure 1:
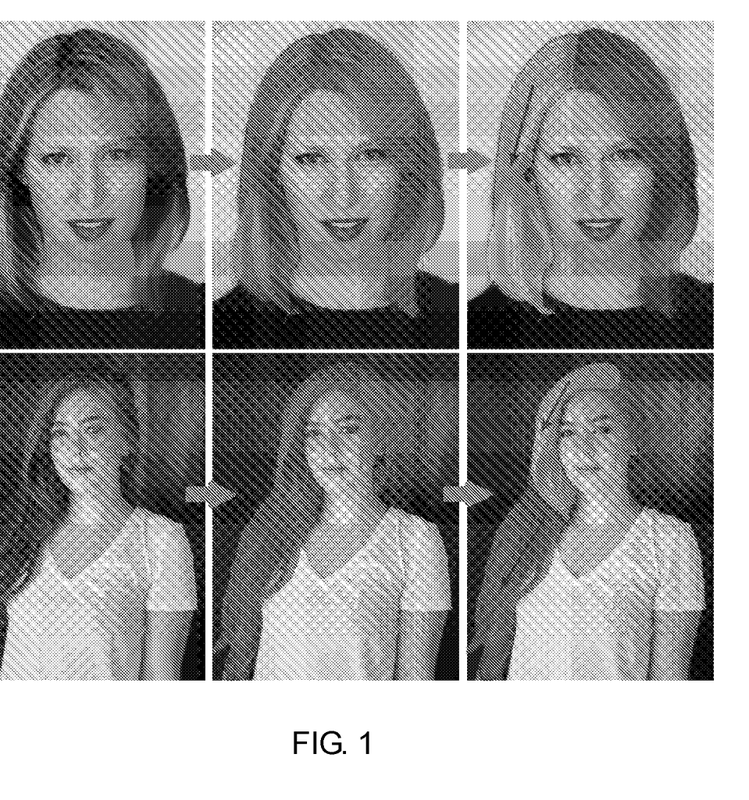
FIG. 1 is a diagram of labeling training data: left column: original images: middle column: hair segmentation mask images; right column: direction-based sub-region segmentation and direction maps.

1. Preprocessing of hair training data: labeling the two-dimensional (2D) mask and growth direction of hair, and obtaining a classification of different hair styles by an unsupervised clustering method;

1.1 Labeling training data:

20,000 portrait photos with clearly visible faces and hair as well as common hair styles and sufficient light intensity are used as training data. PaintSelection (LIU, J., SUN, J., AND SHUM, H.-Y. 2009. Paint selection. In ACM Transactions on Graphics (ToG), vol. 28. ACM, 69.) is used for matting the photos to obtain binary region masks $M_h$ of the hair. For each of the photos, the hair region $M_h$ is segmented into a number of hair growth direction sub-regions with consistent smooth variations. For each sub-region, the direction of growth of the strand is labeled with one stroke, then the direction is propagated to all pixels of the sub-region and combined with a non-directional orientation map O calculated per pixel to generate a direction map D. Finally, the continuous direction range $[0,2\pi)$ is discretized into four intervals $([0,0.5\pi), [0.5\pi,\pi), [\pi,1.5\pi), [1.5\pi,2\pi))$, and then these four labels are assigned to each pixel to obtain a direction label map $M_d$. Pixels that are not in the hair region will also have a label. FIG. 1 shows an example of labeling a hair mask image and a direction map.

1.2 Hair Style Class Calculation

For each annotated image I. firstly, a robust face alignment method (CAO. X., WEI. Y., WEN. F., AND SUN, J. 2014. Face alignment by explicit fractal regression. International Journal of Computer Vision 107, 2, 177-190.) is used to detect and locate the face label, and then I is matched with I' in a reference face coordinate system for scale and up-direction rectification. Then, a circular distribution histogram (divided into $n_H$ intervals, $n_H$=16) is constructed around a polar coordinate system of the center of the face. Each interval records the number of hair pixels whose polar angles fall within the intervals. After normalization, the histogram can be regarded as an eigenvector of the image. Finally, based on these distribution eigenvectors, a K-means clustering method is used to classify the hair styles in the training images into four classes. An L1-based Earth Mover distance (EMD) (LING. H., AND OKADA. K. 2007. An efficient earth mover's distance algorithm for robust histogram comparison. Pattern Analysis and Machine Intelligence. IEEE Transactions on 29, 5, 820 840-853.) is used to calculate the distance between two histograms $H_a$ and $H_b$. Each cluster center g is the element with the minimum sum distances with other elements in the cluster.

Figure 2:
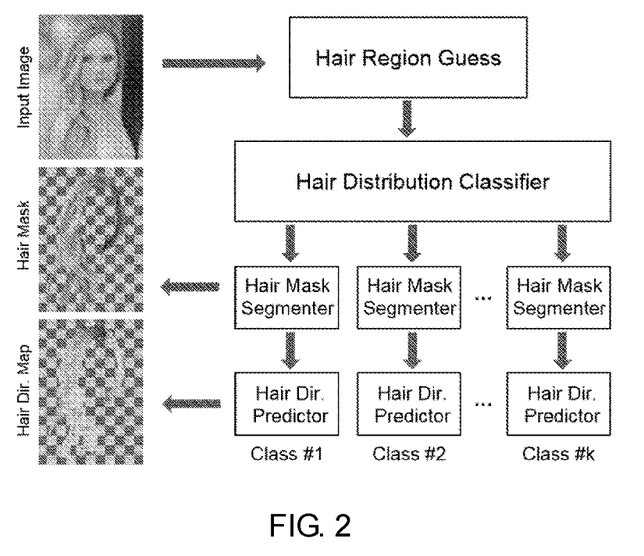
FIG. 2 is a flow chart of hair style identification, hair segmentation and direction estimation; for the estimation of a given hair region, firstly, the class of the hair style is identified, and then a segmentation mask image and a direction map are obtained by selecting a corresponding segmentation network and a direction estimation network according to the class.
Figure 3:
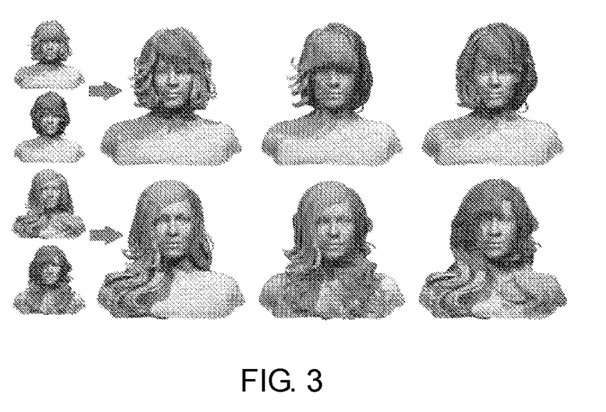
FIG. 3 is a process diagram of segmentation and recombination of 3D hair exemplars and generation of new exemplars; left column of each row: two original hair exemplars: three columns on the right of each row: decomposing original strands and then recombining and generating three new hair exemplars.

2. Hair segmentation and direction estimation based on a deep neural network: training a deep neural network based on labeled data of step 1, utilizing a hierarchical deep convolutional neural network obtained by the training to achieve hair distribution class identification, hair segmentation and hair growth direction estimation: the algorithm flow is shown in FIG. 2.

2.1 Estimation of Hair Region

Given a portrait photo, firstly, the face alignment method in step 1.2 is used to detect a set of facial feature points and the photo is aligned to the reference face coordinate system. Next, for each hair style distribution class, 20 typical hair bounding boxes are selected and are aligned with the face region of the photo through rotation and scaling, resulting in a set of candidate hair regions. The typical hair bounding boxes are generated by pre-clustering the bounding box of each class of hair distribution. These candidate regions will be cropped and passed independently to a subsequent identifier for hair style identification.

2.2 Hair Style Identification. Hair Segmentation and Direction Estimation

Hair style identification is performed based on the hair regions obtained in step 2.1. Hair style identification is to use an R-CNN deep convolutional neural network structure (GIRSHICK. R., DONAHUE. J., DARRELL, T., AND MALIK, J. 2014. Rich feature hierarchies for accurate object detection and semantic segmentation. In Computer Vision and pattern Recognition (CVPR). 2014 IEEE Conference on. IEEE, 580-587.), and further study on the hair training data labeled in step 1.1. After obtaining the class of the hair style, the segmentation and direction estimation of the hair regions are performed. The hair segmentation and hair direction estimation are both designed based on the public deep neural network VGG16 (SIMONYAN. K., AND ZISSERMAN. A. 2014. Very deep convolutional network for large-scale image identification, arXivpreprint859 arXiv: 1409.1556.), the network is a classification network which is pre-trained on the public dataset ImageNet and identifies 1,000 classes. The present disclosure has made changes based on this, so that the output of the network is the label of each pixel (the number of output label for a segmenter is 2, and the number of output label for a direction estimator is 5). Firstly, the max-pooling layer of the last two max-pooling layers 2×2 are removed to increase the network layer resolution, and the receptive fields following convolutional layers are also enlarged from 3×3 and 7×7 to 5×5 and 25×25 (padded with zeros), respectively. Secondly, all fully connected layers are replaced with convolutional layers, which allows a single identification network to be compatible with the pixel-by-pixel label segmenter of the present disclosure. Thirdly, during the training stage, a loss layer calculates the sum of the cross entropy over the entire image between the output labels and the manual labels (since there are three max-pooling layers in VGG16, the resolution of the image is downsampled by eight times). Finally, during the testing stage, the output label image is upsampled to the original image size by a bilinear interpolation and refined with a fully connected CRF.

In the present disclosure, the image sizes for both the training and testing stages are 512×512. In the testing stage, given a portrait photo I, a face detector first aligns the image into the face coordinate system and generates a set of hair region estimations around the face. A hair style identification network then tests each candidate region and selects the one with the highest score as the class of the hair style. The hair segmentation network and direction estimation network corresponding to this class will be applied to I in turn. The output of the segmentation network is a hair segmentation mask $M_I$ with the same size as I (with an alpha channel), while the output of the direction estimation network is an equal-sized direction label image that is combined with the non-directional orientation image to generate the final direction map $D_I$.

3. Generation and organization of 3D hair exemplars: generating a large number of new hair style exemplars by decomposing and recombining strands of original hair models, and generating 2D mask images and hair growth direction maps by projection to facilitate subsequent matching;

3.1 Preprocessing 300 3D models of different hair styles $\{H\}$) are collected. All models have been aligned to the same reference human head model and are composed of a large number of independent thin polygon-strands $\{S_H\}$. Each strand represents a consistent hair wisp, with the growth direction encoded in parametric texture coordinates. A further process is performed for each model to improve the quality of the model: for strands that are not connected to the scalp, strands that are connected to the scalp and are closest to these strands are found and smoothly connected with these strands to form longer strands that are connected to the scalp: for over-thick strands (more than one-tenth of the radius of the human head), they are evenly divided into two sets of strands along the growth direction, until the strand width meets the requirement.

3.2 Exemplar Generation

The 3D hair exemplars obtained in step 3.1 are decomposed into different sets $$d_s(S_a, S_b) = \frac{\sum_{i=1}^{min(n_a,n_b)} \max(\|p_i^a - p_i^b\| - r_a - b_b, 0)}{min(n_a, n_b)},$$

values of RGB channels. Thus, a 2D projection direction map of the hair exemplar can be drawn.

To handle non-front viewing angles, six angles are uniformly sampled for yaw and pitch angles in $[-\pi/4,\pi/4]$. Thus, there will be 6×6 sets of hair mask images and direction maps. All images are downsampled to 100×100 for subsequent matching and calculation efficiency.

4. Data-driven hair modeling: matching the 3D hair exemplars in step 3 with a hair mask image and a hair growth direction map segmented in step 2, performing deformation, and generating a final model:

4.1 Image-Based 3D Hair Exemplar Matching

The hair mask images and the hair growth direction maps obtained in step 2 are used to select a set of suitable 3D exemplars. It takes two steps of comparisons to achieve a quick search of a large number of data exemplars:

Area comparison: firstly, according to facial feature points, input images are aligned with the coordinate system of the exemplar projection image. The hair mask area of the exemplar projection $|M_H|$ is then compared with the hair mask area of the input image $|M_I|$. The mask area of the exemplar is retained within the range $(0.8|M_I|,1.25|M_I|)$.

Image matching: in the present disclosure, for each exemplar passed the comparison in the first step, the hair mask image and the direction map of the exemplar $(M_H^*, D_H^*)$ are compared with the hair mask image and the direction map of the input image $(M_I^*,D_I^*)$. If the input image is not a front view image, the image with the closet angle view will be selected among the precalculated 6×6 sets of exemplar projection images for comparison. The comparison of hair mask images is calculated based on the distance field $W_I^*$ of the boundary M, (BALAN. AO, SIGsAL. L., BLACK, MJ. DAVIS. JE. AND HAUSSECKER. HW 2007. Detailed human shape and pose from images. In Computer Vision and pattern Recognition, 2007. CVPR'07. IEEE Conference on, IEEE, 1-8.):

$$d_M(M_H^*, M_I^*) = \frac{\sum_{i \in M_H^* \oplus M_I^*} |W_I^*(i)|}{|M_I^*|}.$$

Where. $M_H^*$ and $M_I^*$ are the hair mask image of the exemplar and the hair mask image of the input image, respectively. $M_H^* \oplus M_I^*$ represents the symmetry difference between two masks, $W_I^*(i)$ is the value of the distance field. The distance of the direction map is defined as the sum of the direction differences $d_d$531 $[0,\pi)$ of the pixels:

$$d_D(D_H^*, D_I^*) = \frac{\sum_{i \in M_H^* \cap M_I^*} d_d(D_H^*(i), D_I^*(i))}{n_{M_H^* \cap M_I^*}}.$$

Where, $D_H^*$ and $D_I^*$ are the direction map of the exemplar and the direction map of the input image, respectively, $M_H^* \cap M_I^*$ is the overlapping region of two masks, $n_{M_H^* \cap M_I^*}$ is the number of pixels of the overlapping region, $d_d(D_H^*(i),D_I^*(i))$ is overlapping pixels direction differences. Finally, the exemplars that satisfy $d_M(M_H^*,M_I^*)<4$ and $d_D(D_H^*, D_I^*)<0.5$ are retained as final candidate exemplars $\{H\}$.

4.2 Hair Deformation

Firstly, the boundary matching is performed between the hair mask image of the exemplar hair and the mask image of the input image. For each candidate exemplar H, firstly, it is transformed to the pose of the face in I, and then the hair mask image and the direction map $(M_H, D_H)$ are obtained by rendering according to the method in step 3.3. Here, the rendered image is not a downsampled thumbnail, instead, the resolution of the rendered image is the same as the input image. Then, 200/2000 points $\{P^H\}/\{P^I\}$ are uniformly sampled at the boundaries of the masks $M_H/M_I$, respectively. For each boundary point $P_i^H/P_i^I$, its position is denoted as $p_i^H/p_i^I$, and outward normal as $n_i^H/n_i^I$. Point-to-point correspondences between boundaries $M(\{P^H\} \to \{P^I\})$ are calculated. For each point $P_i^H$ of the hair mask boundary of a candidate model, it is obtained by optimizing the following matching energy equation at the optimal correspondence point $P_{M(i)}^I$ of the input hair mask boundary:

$$\arg\min_{M} \sum_{P_i^H} (E_p(P_i^H) + E_e(P_i^H, P_{i+1}^H)),$$

where $E_p$ and $E_e$ are energy items that measure point matching and edge matching. $E_p$ expects the positions of the pair of points and the normals to be as close as possible, and the value of the weight $\lambda_a$ is 10; $E_c$ expects the mapping M to maintain the length of the original boundary as much as possible:

$$E_p(P_i^H) = \|p_i^H - p_{M(i)}^I\|^2 + \lambda_o(1 - n_i^H \cdot n_{M(i)}^I)^2.$$

$$E_e(P_i^H, P_{i-1}^H) = (\|p_i^H - p_{i-1}^H\| - \|p_{M(i)}^I - p_{M(i+1)}^I\|)^2.$$

Where $p_i^H$ is the position of the boundary point of the hair mask image of the candidate exemplar, $p_{M(i)}^I$ is the position of the optimal correspondence point of the boundary of the input hair mask, $n_i^H$, $n_{M(i)}^I$ are the normals of $p_i^H$ and $p_{M(i)}^I$.

$$\underset{v'_i}{\mathrm{argmin}} \sum_{v_i \in V_{ij}} \left( \|v'_i - W(v_i)\|^2 + \lambda_s \left\| \Delta v'_i - \frac{\delta_i}{|\Delta v'_i|} \Delta v'_i \right\|^2 \right).$$

diffusion and curvature flow. In Proceedings of ACM SIGGRAPH, 317-324.). $\delta_i$ is the magnitude of the Laplacian coordinates of the vertex $v_i$ in the original model H. The weight is $\lambda_s=1$. The optimization function can be solved using the inexact Gaussian Newton method (HUANG, J., SHI. X., LIU. X., ZHOU. K., WEI. L.-Y., TENG. S.-H., BAO. H., GUO, B., AND SHUM, H.-Y. 2006. Subspace gradient domain mesh deformation. ACM Trans. Graph. 25, 3 (July), 1126-1134.). After the deformation, hair exemplars {H'} that match the input image better can be obtained.

4.3 Final Hair Generation

Figure 4:
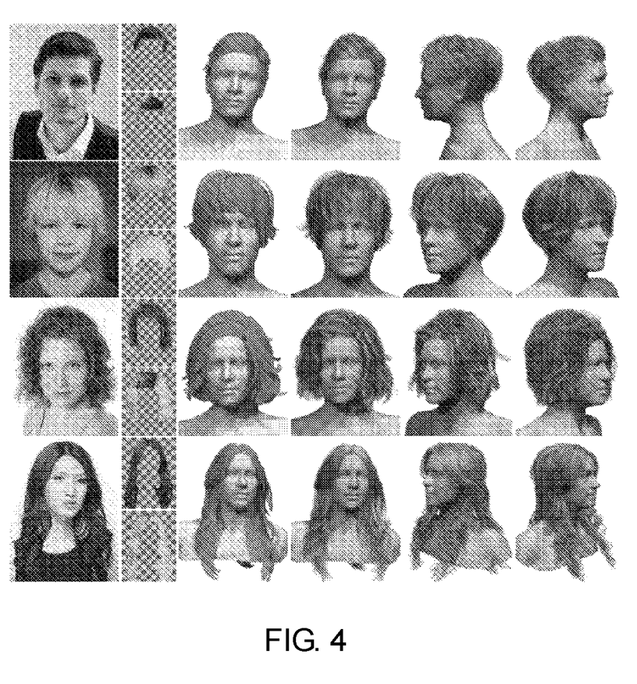
FIG. 4 is 3D hair result images automatically modeled each from a single image according to the present disclosure: each column from left to right: an input image, an automatically segmented hair mask image and a direction estimation map, a deformed matching hair exemplar, and a final strand level hair model from three different view angles.

For the candidate exemplars {H'} obtained through the deformation in step 4.2, a comparison is performed regarding the final direction maps on full-pixel images (the comparison function is consistent with that in step 4.1), and the model H* matching best with the direction map is selected to generate the final hair model. H* will then be converted to be represented as a 3D direction volume within the bounding box of the entire model, and direction diffusion is performed inside the entire volume with the direction vectors given by H* and surface normals of the scalp region being as constraints. Then, 10.000 strands are generated from seeds uniformly sampled on the scalp, with the guidance from volume direction filed. Finally, these strands are deformed according to the growth direction estimation map, to obtain the final hair model (HU. L., MA. C., LUO, L., AND LI, H. 2015. Single-view hair modeling using a hair style database. ACM Transactions on Graphics (TOG) 34, 4, 125.). FIG. 4 shows an example of generating a final hair model from a single image.

Implementation Example

The inventors implemented embodiments of the present disclosure on a machine equipped with an Intel Core i7-3770 central processing unit, an NVidia GTX 970 graphics processing unit and a 32 GB random access memory. The inventors have used all of the parameter values listed in the description of embodiments, and obtained all the experimental results shown in the drawings. The present disclosure can efficiently generate 3D models of a plurality of hair styles from a large number of Internet images, and these strands-level 3D models match greatly with the input images. For a typical 800.800 image, the entire process can be completed within 1 minute: hair segmentation and direction estimation can be completed less than 3 seconds, matching and deformation of 3D hair exemplars takes approximately 20 seconds, and final strands generation takes less than 30 seconds. In the aspect of preparing the training data, it takes an average of 1 minute to process an image; the decomposition and regeneration of the original 3D hair exemplars takes less than 10 hours; and the training of the neural network takes about 8 hours.

What is claimed is:

1. A single-image-based fully automatic three-dimensional (3D) hair modeling method, comprising the following steps:

step 1: preprocessing of hair training data: labeling hair mask images and hair growth direction maps, and obtaining a classification of different hair styles by an unsupervised clustering method;

step 2: fully automatic high-precision hair segmentation and direction estimation: training a deep neural network based on labeled data of step 1, utilizing a hierarchical deep convolutional neural network obtained by the training to achieve hair distribution class identification, hair segmentation and hair growth direction estimation;

step 3: generation and organization of 3D hair exemplars: generating a large number of new hair style exemplars by decomposing and recombining hair of original hair models, and generating hair mask images and hair growth direction maps by projection to facilitate subsequent matching;

step 4: data-driven hair modeling: matching the 3D hair exemplars in step 3 with a hair mask image and a hair growth direction map segmented in step 2, performing deformation, and generating a final model.

2. The single-image-based fully automatic 3D hair modeling method according to claim 1, wherein step 1 comprises following sub-steps:

step 1.1: downloading a large number of portrait images with hair from the Internet, and labeling the hair mask images and the hair growth direction maps;

step 1.2: utilizing labeled hair data obtained in step 1.1 to calculate distribution characteristics of various hair styles for clustering.

3. The single-image-based fully automatic 3D hair modeling method according to claim 1, wherein step 2 comprises following sub-steps:

step 2.1: automatically estimating a hair region in an input image;

step 2.2: utilizing a deep neural network Regions with Convolution Neural Network (R-CNN) to identify a class of a hair style based on the hair region obtained in step 2.1;

step 2.3: selecting a corresponding segmentation neural network based on the hair style obtained in step 2.2 to segment hair from the image to obtain a hair mask image;

step 2.4: selecting a corresponding direction estimation neural network based on the hair style obtained in step 2.2 to predict a direction map of the corresponding hair.

4. The single-image-based fully automatic 3D hair modeling method according to claim 1, wherein step 3 comprises following sub-steps:

step 3.1: decomposing strands of the original 3D hair models, and then mixing the decomposed strands to generate new hair exemplars;

step 3.2: projecting the hair exemplars obtained in step 3.1 to generate the hair mask images and the hair growth direction maps to facilitate subsequent matching.

5. The single-image-based fully automatic 3D hair modeling method according to claim 1, wherein step 4 comprises following sub-steps:

step 4.1: matching a hair mask image and a hair growth direction map segmented in step 2 with the hair mask images and the growth hair growth direction maps generated by projecting the exemplars in step 3 to select a suitable set of exemplars;

step 4.2: deforming hair exemplars in the step 4.1 to match hair in an image in a better way;

step 4.3: performing direction map matching on the deformed exemplars obtained in step 4.2 according to the method in step 4.1 to select best exemplars to generate the final hair models.

\* \* \* \* \*